United States Patent
Park et al.

(10) Patent No.: US 8,737,250 B2
(45) Date of Patent: May 27, 2014

(54) APPARATUS AND METHOD FOR TRACKING POSITION OF FIXED NODE

(75) Inventors: Jong jun Park, Daejeon (KR); Seung mok Yoo, Daejeon (KR); Nae soo Kim, Daejeon (KR); Cheol sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 145 days.

(21) Appl. No.: 13/326,865

(22) Filed: Dec. 15, 2011

(65) Prior Publication Data

US 2012/0155305 A1  Jun. 21, 2012

(30) Foreign Application Priority Data

Dec. 15, 2010 (KR) .................. 10-2010-0128075

(51) Int. Cl.
*H04L 12/26* (2006.01)
(52) U.S. Cl.
USPC ........................................................ 370/252
(58) Field of Classification Search
USPC ............ 370/241, 250, 252; 455/404.2, 456.1; 340/539.13; 342/450–465
See application file for complete search history.

(56) References Cited

U.S. PATENT DOCUMENTS

| 2007/0049291 A1 | 3/2007 | Kim et al. |
| 2009/0186626 A1* | 7/2009 | Raghothaman ............ 455/452.2 |
| 2011/0201347 A1* | 8/2011 | Abraham et al. .......... 455/456.1 |

FOREIGN PATENT DOCUMENTS

KR  1020100070626  6/2010

* cited by examiner

*Primary Examiner* — Michael Thier
*Assistant Examiner* — Feben M Haile
(74) *Attorney, Agent, or Firm* — Nelson Mullins Riley & Scarborough LLP; Anthony A. Laurentano, Esq.

(57) ABSTRACT

Provided is an apparatus and method for tracking a position of a fixed node. The position tracking apparatus of the fixed node may include: an interface to extract, from a database in response to the occurrence of an event about tracking the position of the fixed node, packet data corresponding to a mobile node associated with the event; and a processor to analyze a received signal strength of the packet data and a position of the mobile node from the packet data, and to track the position of the fixed node using the analysis result.

10 Claims, 6 Drawing Sheets

| TIME | t1 | t2 | ... | tn |
|---|---|---|---|---|
| POSITION | (x1, y1) | (x2, y2) | ... | (xn, yn) |
| SIGNAL STRENGTH | RSS1 | RSS2 | ... | RSSn |

FIG. 5

| x | 10 | 20 | 30 | 50 | 60 | 70 |
|---|---|---|---|---|---|---|
| SIGNAL STRENGTH | 80 | 70 | 50 | 45 | 66 | 85 |

FIG. 6

APPARATUS AND METHOD FOR TRACKING POSITION OF FIXED NODE

CROSS-REFERENCE TO RELATED APPLICATION

This application claims the benefit of Korean Patent Application No. 10-2010-0128075, filed on Dec. 15, 2010, in the Korean Intellectual Property Office, the disclosure of which is incorporated herein by reference.

BACKGROUND

1. Field of the Invention

Embodiments of the present invention relate to an apparatus and method that may analyze a position of a mobile node and a received signal strength of packet data using packet data received from the mobile node, and may track a position of a fixed node based on the analysis result.

2. Description of the Related Art

In general, a node of which a position is to be tracked (hereinafter, an unknown node) in a wireless network may predict a distance from a reference node and may predict the position of the unknown node based on the predicted distance.

A distance prediction scheme may include a Time of Arrival (TOA) scheme for measuring a travel time of an ultrasonic signal, a Time Difference of Arrival (TDOA) scheme using a time difference of arrival between two signals of which speeds are different from each other, and a Received Signal Strength Indicator (RSSI) scheme using a signal strength.

However, the TOA scheme and the TDOA scheme may require additional hardware for distance measurement or a high performance sight measurement apparatus. Also, in the case of the RSSI scheme, a distance prediction may be inaccurate due to a change in the signal strength according to an environment, a different antenna pattern according to a direction, an obstacle, and the like. In addition, to employ the RSSI scheme, a plurality of reference nodes being aware of their own positions may need to be arranged in a network arrangement area. In general, an installer may directly input the positions of the reference nodes, thereby increasing an arrangement cost and an arrangement time in the substantial arrangement.

Accordingly, there is a need for technology that may track positions of a plurality of reference nodes and also decrease an arrangement cost of a network without using additional hardware.

SUMMARY

An aspect of the present invention provides an apparatus and method that may analyze a position of a mobile node and a received signal strength with respect to packet based on packet data received from the mobile node and readily track a position of a fixed node based on the analysis result, thereby decreasing a cost for additional hardware installation or reference node installation that is required for position tracking.

According to an aspect of the present invention, there is provided an apparatus for tracking a position of a fixed node, the apparatus including: an interface to extract, from a database in response to the occurrence of an event about tracking the position of the fixed node, packet data corresponding to a mobile node associated with the event; and a processor to analyze a received signal strength of the packet data and a position of the mobile node from the packet data, and to track the position of the fixed node using the analysis result.

According to another aspect of the present invention, there is provided a method of tracking a position of a fixed node, the method including: extracting, from a database in response to the occurrence of an event about tracking the position of the fixed node, packet data corresponding to a mobile node associated with the event; and analyzing a received signal strength of the packet data and a position of the mobile node from the packet data and to track the position of the fixed node using the analysis result.

EFFECT

According to embodiments of the present invention, it is possible to decrease a cost for additional hardware installation or reference node installation, required for position tracking, by analyzing a position of a mobile node and a received signal strength with respect to packet based on packet data received from the mobile node, and by readily tracking a position of a fixed node based on the analysis result.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, an apparatus and method for tracking a position of a fixed node according to embodiments of the present invention will be described with reference to the accompanying drawings.

Figure 1:
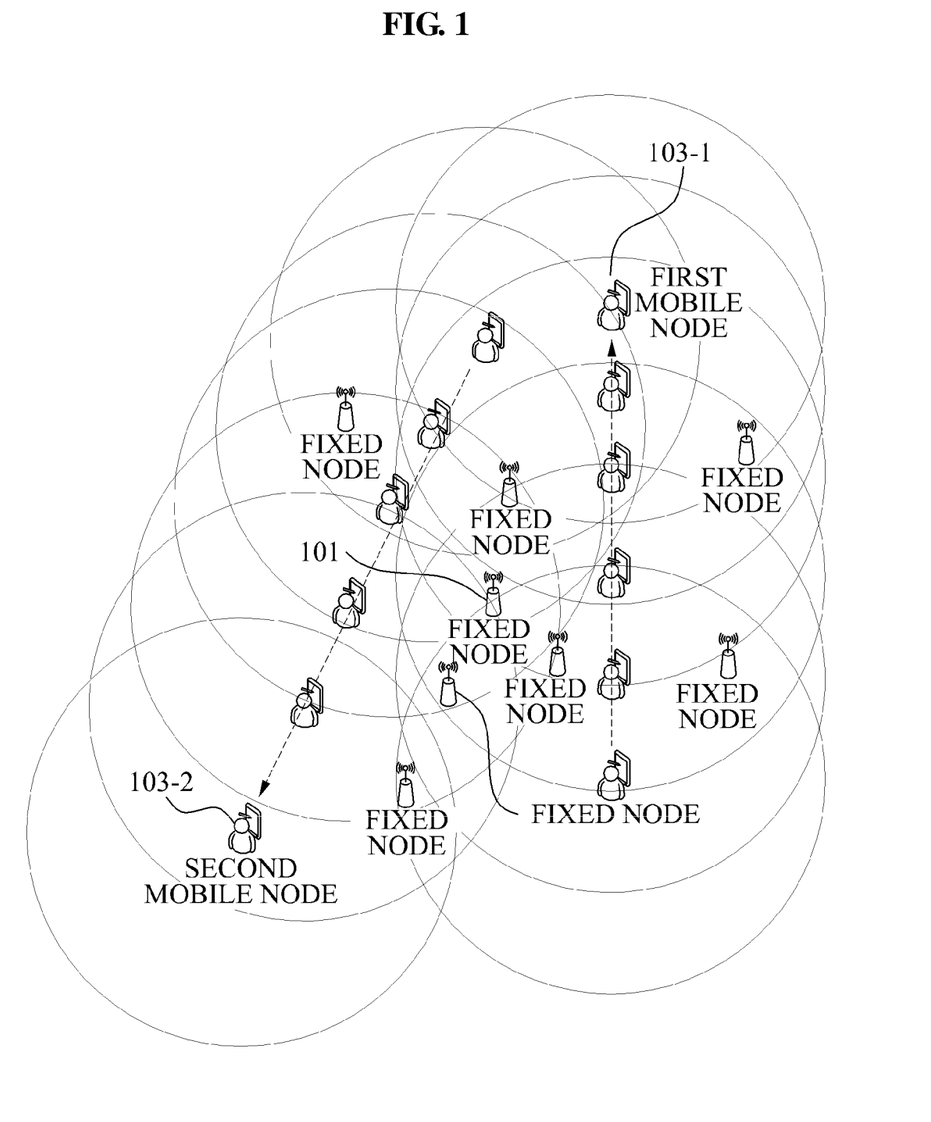
FIG. 1 is a diagram illustrating a relationship between a mobile node and a fixed node including a position tracking apparatus of the fixed node according to an embodiment of the present invention.

FIG. 1 is a diagram illustrating a relationship between a mobile node and a fixed node including a position tracking apparatus of the fixed node according to an embodiment of the present invention.

Referring to FIG. 1, a fixed node 101 may correspond to a node of which a position is fixed, and may include a position tracking apparatus. The fixed node 101 may receive positions of mobile nodes from the mobile nodes, and may track the position of the fixed node 101 based on the received positions. In this instance, the fixed node 101 may receive positions of at least two mobile nodes, for example, a first mobile node 103-1 and a second mobile node 103-2, from the at least two mobiles nodes.

Each of the first mobile node 103-1 and the second mobile node 103-2 may correspond to a node of which a position varies. The first mobile node 103-1 and the second mobile node 103-2 may receive positions of the first mobile node 103-1 and the second mobile node 103-2 from a navigation module and transmit, to the fixed node 101, positions varied over a time.

In this instance, each of the first mobile node 103-1 and the second mobile node 103-2 may configure, as packet data, identification (ID) information, a sequence, a time, a position, and a broadcasting interval, and may transmit the packet data to the fixed node 101. When configuring the packet data, the first mobile node 103-1 and the second mobile node 103-2 may use a time and an interval provided from the navigation module. When the time and the interval are not provided from the navigation module, the first mobile node 103-1 and the second mobile node 103-2 may set the time and the interval and use the set time and interval.

Figure 2:
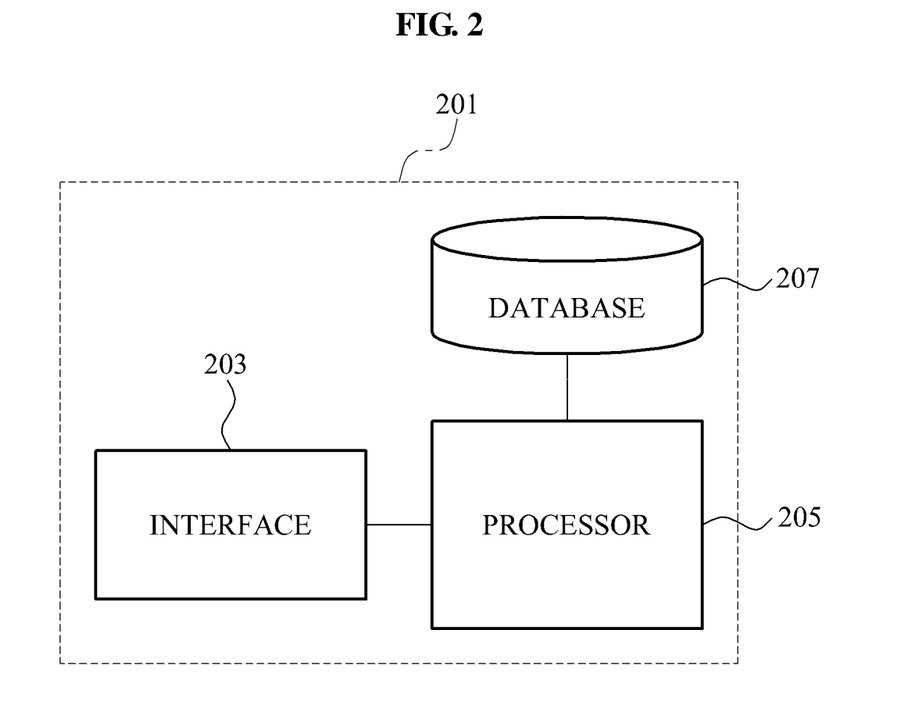
FIG. 2 is a block diagram illustrating a configuration of a position tracking apparatus of a fixed node according to an embodiment of the present invention.

FIG. 2 is a block diagram illustrating a configuration of a position tracking apparatus 201 of a fixed node according to an embodiment of the present invention.

Referring to FIG. 2, the position tracking apparatus 201 of the fixed node may include an interface 203, a processor 205, and a database 207.

The interface 203 may periodically receive packet data from a mobile node, may store the received packet data in the database 207 based on ID information of the mobile node, and may set a position time for generating an event about tracking the position of the fixed node. Specifically, the interface 203 may decode the packet data received from the mobile node and thereby verify ID information. When packet data corresponding to the ID information is absent in the database 207, the interface 203 may store the packet data in the database 207 and set the position time for generating the event about tracking the position of the fixed node in association with the ID information. Conversely, when the packet data corresponding to the ID information is present in the database 207, the interface 203 may store the packet data in the database 207 and reset the preset position and reset the event.

The interface 203 may set two to three folds of a broadcasting interval of the mobile node as the position time based on a loss occurring in receiving packet data from the mobile node.

In response to the occurrence of the event about tracking the position of the fixed node according to termination of the set position time, the interface 203 may extract, from the database 207, packet data corresponding to the mobile node associated with the event.

The processor 205 may analyze a received signal strength of the packet data and a position of the mobile node from the packet data, and may track the position of the fixed node using the analysis result.

Based on the analysis result, the processor 205 may induce a first trend line with respect to a motion of a first mobile node among mobile nodes to extract a first virtual line that is perpendicular to a gradient of the first trend line and passes a center of the first trend line, may induce a second trend line with respect to a motion of a second mobile node among the mobile modes to extract a second virtual line that is perpendicular to a gradient of the second trend line and passes a center of the second trend line, and may track, as the position of the fixed node, an intersecting point of the first virtual line and the second virtual line. The processor 205 may store the first trend line and the second trend line in the database 207.

In this instance, the processor 205 may selectively extract, from packet data stored in the database 207 in correspondence to the first mobile node and the second mobile node, packet data of a received signal strength that satisfies a predetermined reference received signal strength, and may induce a trend line with respect to each of the first mobile node and the second mobile node by applying, to a trend scheme, a plurality of positions analyzed from the extracted packet data.

The processor 205 may verify the average of distances between positions of a mobile nodes and a trend line. When the average is greater than a predetermined reference average, the processor 205 may re-induce the trend line. For example, when the average of a first distance of a perpendicular connected from a first position of the first mobile node analyzed from first packet data to the first trend line, and a second distance of a perpendicular connected from a second position of the first mobile node analyzed from second packet data, to the first trend line is greater than a predetermined reference average, the processor 205 may re-induce the first trend line using remaining packet data excluding packet that exceeds a predetermined reference distance.

When a number of pieces of packet data extracted from the database 207 is less than a predetermined number of pieces of data, it may correspond to a case where a sufficient number of pieces of packet data required for analysis is not secured due to a significantly fast speed of the mobile node or an obstacle. Accordingly, the processor 205 may determine the packet data as invalid data to thereby delete the packet data from the database 207.

Also, when a change pattern of received signal strengths with respect to the packet data corresponds to a straight line, for example, an increasing straight line or a decreasing straight line, based on the analysis result, the processor 205 may determine the packet data as invalid data to thereby delete the packet data from the database 207. When the change pattern of received signal strengths with respect to the packet data corresponds to a curved line, for example, an increasing and then decreasing pattern, based on the analysis result, the processor 205 may determine the packet data as valid data.

The processor 205 may approximate, as a trend line, a position value using a linear function and perform approximation by performing polynomial curve fitting of the received signal strength using a quadratic function.

The database 207 may store packet data in correspondence to ID information of the mobile node. The database 207 may further store a trend line with respect to a motion of the mobile node.

Figure 3:
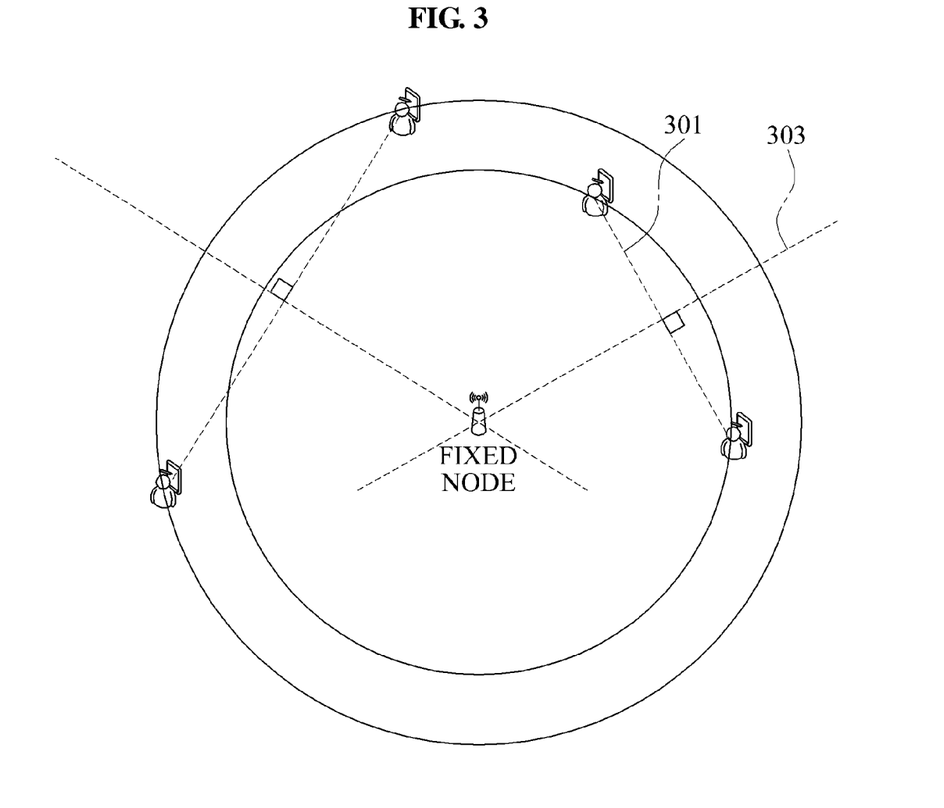
FIG. 3 is a diagram to describe a method of tracking a position of a fixed node in a position tracking apparatus of the fixed node according to an embodiment of the present invention.

FIG. 3 is a diagram to describe a method of tracking a position of a fixed node in a position tracking apparatus of the fixed node according to an embodiment of the present invention.

Referring to FIG. 3, when a circle using the fixed node as an origin is assumed, a perpendicular bisector 303 of a segment 301 connecting a line passing the circle and points contacting with the circle may pass the origin of the circle at all times. In this instance, two perpendicular bisectors not in parallel with each other may meet at a single point at all times and the point may correspond to the origin of the circle at all times. Even though circles have different radiuses, a perpendicular bisector with respect to a segment of each circle may meet at the origin of the circle at all times.

Accordingly, when a gradient of a straight line passing a circle using a fixed node as an origin and a center of a segment contacting with the circle are obtained by analyzing a mobility pattern of each mobile node with respect to different mobile nodes, it is possible to accurately predict the position of the fixed node without predicting a distance between the fixed node and each mobile node.

Figure 4:
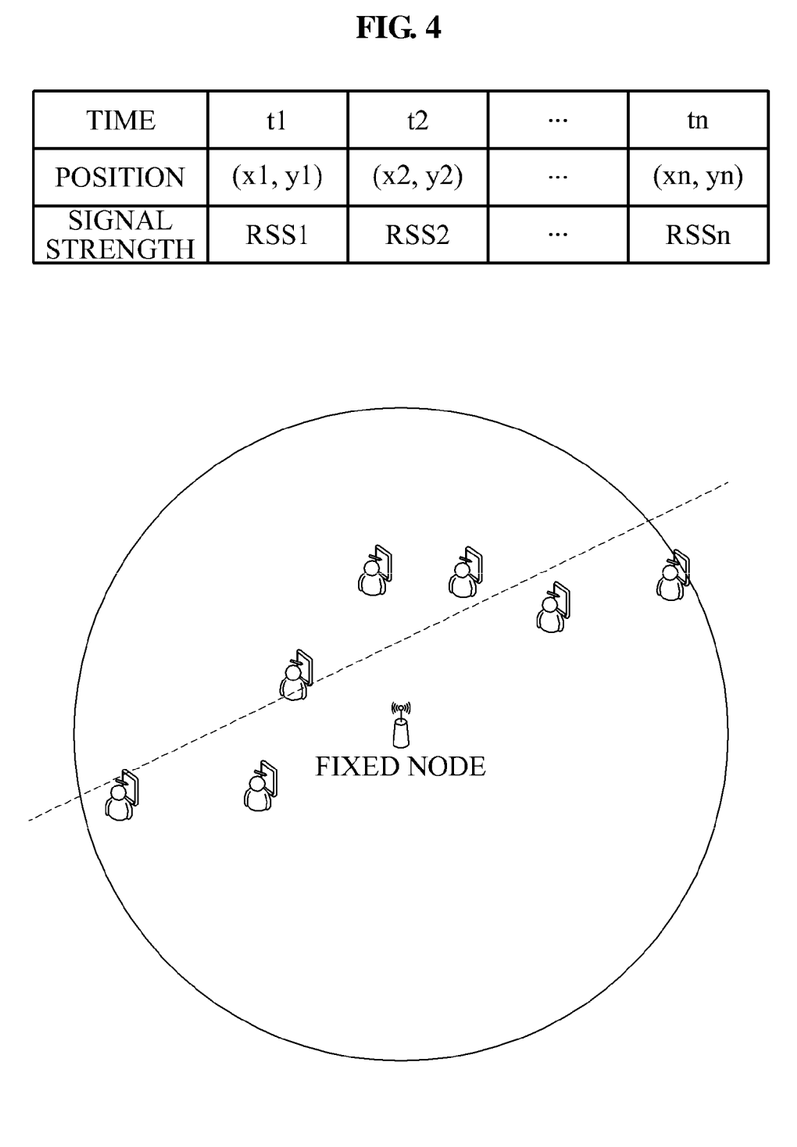
FIG. 4 illustrates diagrams to describe a method of inducing a trend line in a position tracking apparatus of a fixed node according to an embodiment of the present invention.

FIG. 4 illustrates diagrams to describe a method of inducing a trend line in a position tracking apparatus of a fixed node, that is, a trend scheme, according to an embodiment of the present invention.

Referring to FIG. 4, a mobile node may not linearly move at all times and a position for transmitting packet data of the mobile node may not pass a circle at all times.

When a position of the mobile node at each time is expressed from a position value of a list of FIG. 4, the position tracking apparatus of the fixed node may estimate a trend line with respect to the mobile node as shown in the diagram of FIG. 4.

When the trend line is predicted, the position tracking apparatus of the fixed node may obtain a length of a perpendicular connected from a position of each mobile node to the trend line, and may obtain the average and variance with respect to the lengths. In this instance, when the average is greater than a predetermined reference average, the position tracking apparatus of the fixed node may exclude packet data of which the length of the perpendicular is greater than k folds of a predetermined variance and then may repeat the above process. Here, k denotes an integer.

When a number of positions used for trend line prediction is less than a predetermined number of pieces of packet data, or when the average is greater than the reference average, the position tracking apparatus of the fixed node may determine the packet data as invalid data to thereby delete the packet data.

When the average of lengths of perpendiculars obtained from the predicted trend line is less than the reference average, the position tracking apparatus of the fixed node may store the trend line in the database.

Hereinafter, polynomial curve fitting will be described.

When a given position value corresponds to $(x_1,y_1)$, $(x_2,y_2)$, ..., $(x_n,y_n)$, the position tracking apparatus of the fixed node may approximate the given position value using k-order polynomial, which may be expressed according to Equation 1. Here, the position value may correspond to two-dimensional (2D) coordinates and thus, may be indicated using a latitude and a longitude when the given position value corresponds to vertical coordinates (x, y) or a Global Positioning System (GPS).

$$y = a_0 + a_1 x + a_2 x^2 + \ldots + a_k x^k \quad \text{[Equation 1]}$$

When the position tracking apparatus of the fixed node obtains an error by directly replacing Equation 1 with n pieces of data, a sum of squares of errors may be expressed according to Equation 2:

$$E^2 \equiv \sum_{i=1}^{n} [(y_i - (a_0 + a_1 x_i + \ldots a_k x_i^k))]^2 \quad \text{[Equation 2]}$$

In a least square approximation, an optimal solution may correspond to a coefficient value of an approximation function minimizing the sum of squares of errors. It may indicate that a most approximate curve is found from data given using the least square approximation. When setting, as '0', a differential value of each coefficient value of a k-order approximation proximal in Equation 2, it may be expressed according to Equation 3:

$$\frac{\partial (E^2)}{\partial a_0} = -2 \sum_{i=1}^{n} [y - (a_0 + a_1 x + \ldots + a_k x^k)] = 0 \quad \text{[Equation 3]}$$

$$\frac{\partial (E^2)}{\partial a_1} = -2 \sum_{i=1}^{n} [y - (a_0 + a_1 x + \ldots + a_k x^k)] x = 0$$

$$\vdots$$

$$\frac{\partial (E^2)}{\partial a_k} = -2 \sum_{i=1}^{n} [y - (a_0 + a_1 x + \ldots + a_k x^k)] x^k = 0$$

When expressing Equation 3 in a matrix form by developing Equation 3, it may be expressed according to Equation 4:

$$\begin{bmatrix} n & \sum_{i=1}^{n} x_i & \cdots & \sum_{i=1}^{n} x_i^k \\ \sum_{i=1}^{n} x_i & \sum_{i=1}^{n} x_i^2 & \cdots & \sum_{i=1}^{n} x_i^{k+1} \\ \vdots & \vdots & \ddots & \vdots \\ \sum_{i=1}^{n} x_i^k & \sum_{i=1}^{n} x_i^{k+1} & \cdots & \sum_{i=1}^{n} x_i^{2k} \end{bmatrix} \begin{bmatrix} a_0 \\ a_1 \\ \vdots \\ a_k \end{bmatrix} = \begin{bmatrix} \sum_{i=1}^{n} y_i \\ \sum_{i=1}^{n} x_i y_i \\ \vdots \\ \sum_{i=1}^{n} x_i^k y \end{bmatrix} \quad \text{[Equation 4]}$$

The matrix of Equation 4 may refer to a Vandermonde matrix and thus, may be expressed according to Equation 5:

$$\begin{bmatrix} 1 & x_1 & x_1^2 & \cdots & x_1^k \\ 1 & x_2 & x_2^2 & \cdots & x_2^k \\ \vdots & \vdots & \vdots & \ddots & \vdots \\ 1 & x_n & x_n^2 & \cdots & x_n^k \end{bmatrix} \begin{bmatrix} a_0 \\ a_1 \\ \vdots \\ a_k \end{bmatrix} = \begin{bmatrix} y_1 \\ y_2 \\ \vdots \\ y_n \end{bmatrix} \quad \text{[Equation 5]}$$

A matrix form expressed by Equation 5 may be re-written as Y=XA. In Equation 5, k and n may be different from each other. Accordingly, when a least square solution is obtained by performing a normalization of multiplying both sides of Equation 5 by $X^T$, it may be expressed according to Equation 6:

$$A = (X^T X)^{-1} X^T Y \quad \text{[Equation 6]}$$

In this example, when a value of a k order corresponds to '1', it may be a trend line. A received signal strength may be obtained by applying the k order as '2'. Here, in data (x, y) for curve fitting of the received signal strength, x may indicate a position value and y may indicate a received signal strength value. For example, x may correspond to one of coordinates of the position value and indicate a value having a greater change between a latitude and a longitude.

Figure 5:
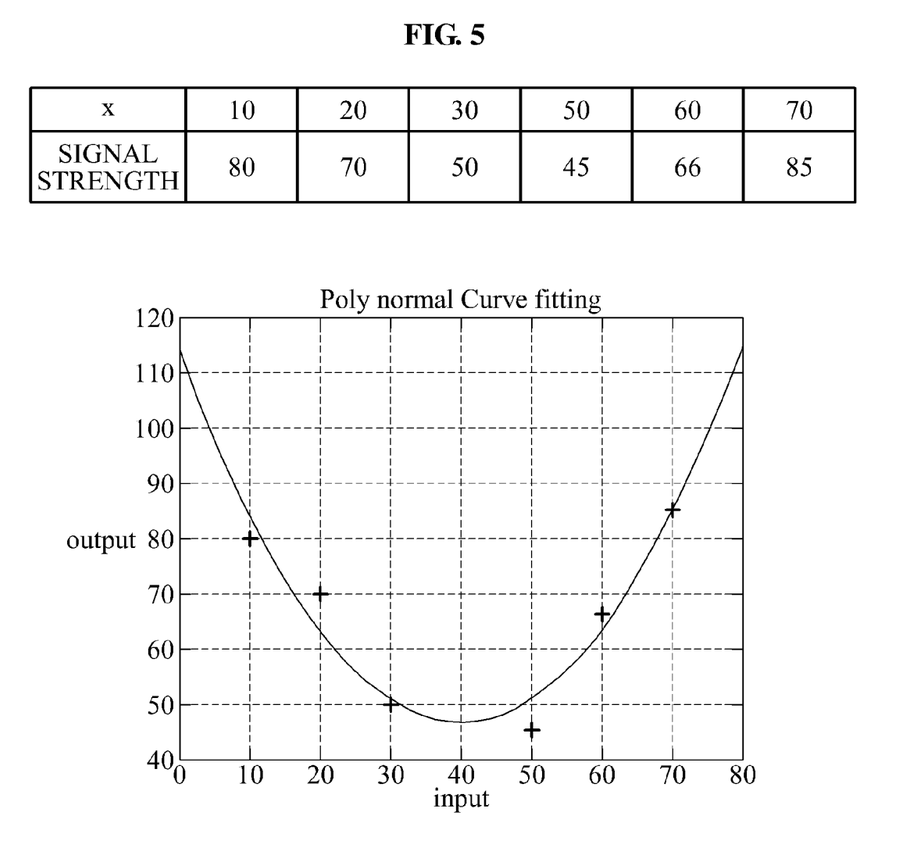
FIG. 5 illustrates a curve fitting result of a position tracking apparatus of a fixed node according to an embodiment of the present invention.

For example, the position tracking apparatus of the fixed node may express the curve fitting result with respect to (x, y) as shown in FIG. 5.

The reason why the received signal strength is expressed using the quadratic function as shown in FIG. 5 is to find only a center of a segment when it is difficult to find an accurate segment passing a circle. That is, when a gradient and a center of a segment are known even though end points of the segment may not be accurately predicted, the position tracking apparatus of the fixed node may obtain a perpendicular bisector passing an origin of the circle, thereby tracking the position of the fixed node. In a quadratic polynomial such as $y=a_0+a_1x+a_2x^2$, a predetermined value x value of when a differential value of the polynomial='0' may correspond to x in (x, y) indicating the center of the section. When applying the corresponding x value to the trend line, y value may be known. A straight line that is perpendicular to the trend line and passes the center may be an equation of the perpendicular bisector to be applied to FIG. 4. Here, x value may be obtained according to Equation 7.

$$\frac{dy}{dx} = a_1 + 2a_2x = 0, x = -\frac{a_1}{2a_2}$$ [Equation 7]

Figure 6:
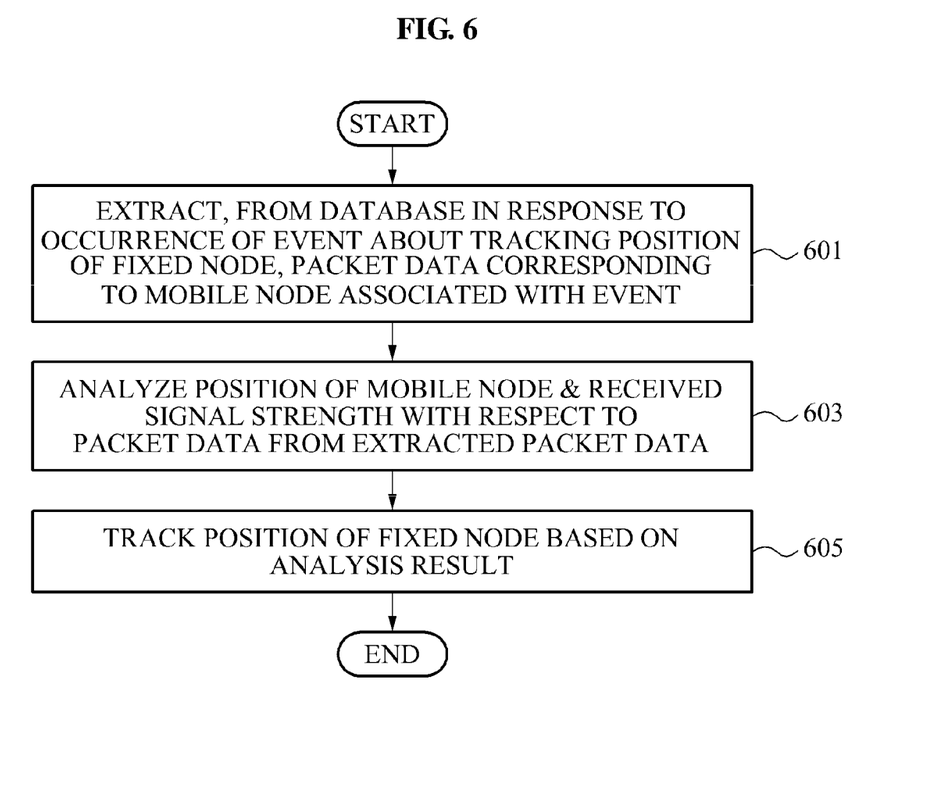
FIG. 6 is a flowchart illustrating a method of tracking a position of a fixed node according to an embodiment of the present invention.

FIG. 6 is a flowchart illustrating a method of tracking a position of a fixed node according to an embodiment of the present invention;

Referring to FIG. 6, in operation 601, a position tracking apparatus of the fixed node may extract, from a database in response to the occurrence of an event about tracking the position of the fixed node, packet data corresponding to a mobile node associated with the event.

The position tracking apparatus of the fixed node may store, in the database based on ID information of the mobile node, packet data that is received from the mobile node, may set a position time for generating the event, and may generate the event about tracking the position of the fixed node according to termination of the set position time.

The position tracking apparatus of the fixed node may selectively extract, from packet data stored in the database in correspondence to each mobile node, packet data of a received signal strength satisfying a predetermined reference received signal strength.

When a number of pieces of packet data extracted from the database is less than a predetermined number of pieces of data, it may correspond to a case where a sufficient number of pieces of packet data required for analysis is not secured due to a significantly fast speed of the mobile node or an obstacle. Accordingly, the position tracking apparatus of the fixed node may determine the packet data as invalid data to thereby delete the packet data from the database.

In operation 603, the position tracking apparatus of the fixed node may analyze a position of the mobile node and the received signal strength with respect to the packet data, based on the packet data.

In this example, the position of the mobile node may be 2D. When the position of the mobile node corresponds to a GPS, the position of the mobile node may be indicated using a longitude and a latitude.

In operation 605, the position tracking apparatus of the fixed node may track the position of the fixed node based on the analysis result.

Based on the analysis result, the position tracking apparatus of the fixed node may induce a first trend line with respect to a motion of a first mobile node among mobile nodes to extract a first virtual, line that is perpendicular to a gradient of the first trend line and passes a center of the first trend line, may induce a second trend line with respect to a motion of a second mobile node among the mobile nodes to extract a second virtual line that is perpendicular to a gradient of the second trend line and passes a center of the second trend line, and may track, as the position of the fixed node, an intersecting point of the first virtual line and the second virtual line.

The position tracking apparatus of the fixed node may verify the average of distances between positions of a mobile node and a trend line. When the average is greater than a predetermined reference average, the position tracking apparatus of the fixed node may re-induce the trend line. For example, when the average of a first distance of a perpendicular connected from a first position of the first mobile node analyzed from first packet data to the first trend line, and a second distance of a perpendicular connected from a second position of the first mobile node analyzed from second packet data to the first trend line is greater than a predetermined reference average, the position tracking apparatus of the fixed node may re-induce the first trend line using remaining packet data excluding packet that exceeds a predetermined reference distance.

Also, when a change pattern of received signal strengths with respect to the packet data corresponds to a straight line, for example, an increasing straight line or a decreasing straight line, based on the analysis result, the position tracking apparatus of the fixed node may determine the packet data as invalid data to thereby delete the packet data from the database. When the change pattern of the received signal strength with respect to the packet data corresponds to a curved line, for example, an increasing and then decreasing pattern, based on the analysis result, the position tracking apparatus of the fixed node may determine the packet data as valid data.

According to embodiments, of the present invention, it is possible to decrease a cost for additional hardware installation or reference node installation, required for position tracking, by analyzing a position of a mobile node and a received signal strength with respect to packet based on packet data received from the mobile node and by readily tracking a position of a fixed node based on the analysis result.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for tracking a position of a fixed node, the apparatus comprising:
an interface to extract, from a database in response to the occurrence of an event about tracking the position of the fixed node, packet data corresponding to a mobile node associated with the event; and a processor to analyze a received signal strength of the packet data and a position of the mobile node from the packet data, and to track the position of the fixed node using the analysis result, wherein, based on the analysis result, the processor induces a first trend line with respect to a motion of a first mobile node among mobile nodes and extracts a first virtual line that is perpendicular to a gradient of the first trend line and passes a center of the first trend line, induces a second trend line with respect to a motion of a second mobile node among the mobile nodes and extracts a second virtual line that is perpendicular to a gradient of the second trend line and passes a center of the second trend line, and tracks, as the position of the fixed node, an intersecting point of the first virtual line and the second virtual line.

2. The apparatus of claim 1, wherein the interface stores, in the database based on identification information of the mobile node, packet data that is received from the mobile node, and sets a position time for generating the event.

3. The apparatus of claim 1, wherein the processor selectively extracts, from first packet data and second packet data stored in the database in correspondence to the first mobile node and the second mobile node, packet data of a received signal strength that satisfies a predetermined reference received signal strength, and induces a trend line with respect to each of the first mobile node and the second mobile node by applying, to a trend scheme, a plurality of positions analyzed from the extracted first packet data and second packet data.

4. The apparatus of claim 1, wherein when the average of a first distance of a perpendicular connected from a first position of the first mobile node analyzed from first packet data to the first trend line, and a second distance of a perpendicular connected from a second position of the first mobile node analyzed from second packet data to the first trend line is greater than a predetermined reference average, the processor re-induces the first trend line using remaining packet data excluding packet data that exceeds a predetermined reference distance.

5. The apparatus of claim 1, wherein when a change pattern of received signal strengths with respect to the packet data corresponds to a straight line based on the analysis result, the processor determines the packet data as invalid data to delete the packet data from the database.

6. A method of tracking a position of a fixed node, the method comprising:

extracting, from a database in response to the occurrence of an event about tracking the position of the fixed node, packet data corresponding to a mobile node associated with the event; and analyzing a received signal strength of the packet data and a position of the mobile node from the packet data and to track the position of the fixed node using the analysis result, wherein the tracking comprises:

inducing a first trend line with respect to a motion of a first mobile node among mobile nodes based on the analysis result;

extracting a first virtual line that is perpendicular to a gradient of the first trend line and passes a center of the first trend line;

inducing a second trend line with respect to a motion of a second mobile node among the mobile nodes and extracting a second virtual line that is perpendicular to a gradient of the second trend line and passes a center of the second trend line; and tracking, as the position of the fixed node, an intersecting point of the first virtual line and the second virtual line.

7. The method of claim 6, further comprising:

storing, in the database based on identification information of the mobile node, packet data that is received from the mobile node, to set a position time for generating the event.

8. The method of claim 6, wherein the inducing of the first trend line comprises extracting, from first packet data and second packet data stored in the database in correspondence to the first mobile node and the second mobile node, packet data of a received signal strength that satisfies a predetermined reference received signal strength, and inducing a trend line with respect to each of the first mobile node and the second mobile node by applying, to a trend scheme, a plurality of positions analyzed from the extracted first packet data and second packet data.

9. The method of claim 6, wherein the tracking comprises re-inducing the first trend line using remaining packet data excluding packet data that exceeds a predetermined reference distance when the average of a first distance of a perpendicular connected from a first position of the first mobile node analyzed from first packet data to the first trend line, and a second distance of a perpendicular connected from a second position of the first mobile node analyzed from second packet data to the first trend line is greater than a predetermined reference average.

10. The method of claim 6, further comprising:

determining the packet data as invalid data to delete the packet data from the database when a change pattern of received signal strengths with respect to the packet data corresponds to a straight line based on the analysis result.

* * * * *